(No Model.)

G. H. GOULD.
CYCLOMETER.

No. 295,632.  Patented Mar. 25, 1884.

WITNESSES
Joseph Ashbaugh.
B. W. Williams

INVENTOR
George H. Gould,
By his Atty.
Henry W. Williams ial content begins here.

UNITED STATES PATENT OFFICE.

GEORGE H. GOULD, OF SOMERVILLE, MASSACHUSETTS.

CYCLOMETER.

SPECIFICATION forming part of Letters Patent No. 295,632, dated March 25, 1884.

Application filed July 31, 1883. (No model.)

*To all whom it may concern:*

Be it known that I, GEORGE H. GOULD, of Somerville, in the county of Middlesex and State of Massachusetts, have invented new and useful Improvements in Cyclometers, of which the following is a specification.

This cyclometer is intended, primarily, for attachment to the hubs of bicycles and tricycles, to determine the distance traveled by the same; but it may be attached to wheels of vehicles of any other kind, if desired.

Figure 1:
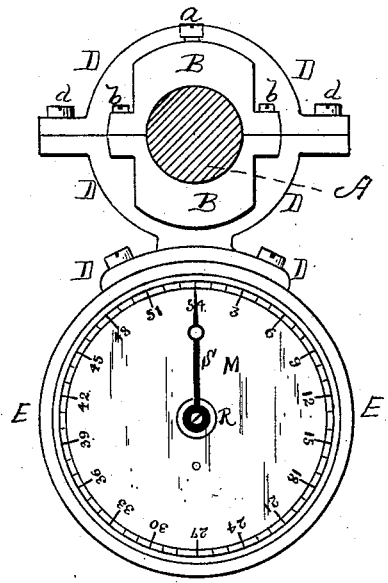
Figure 2:
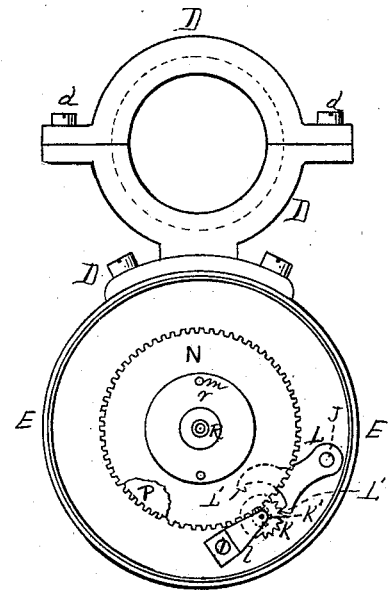
Figure 3:
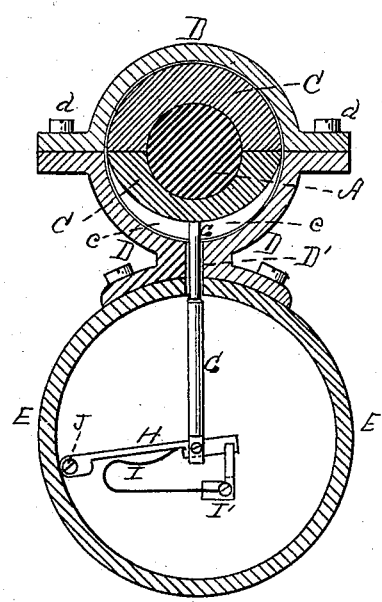
Figures 4, 5:
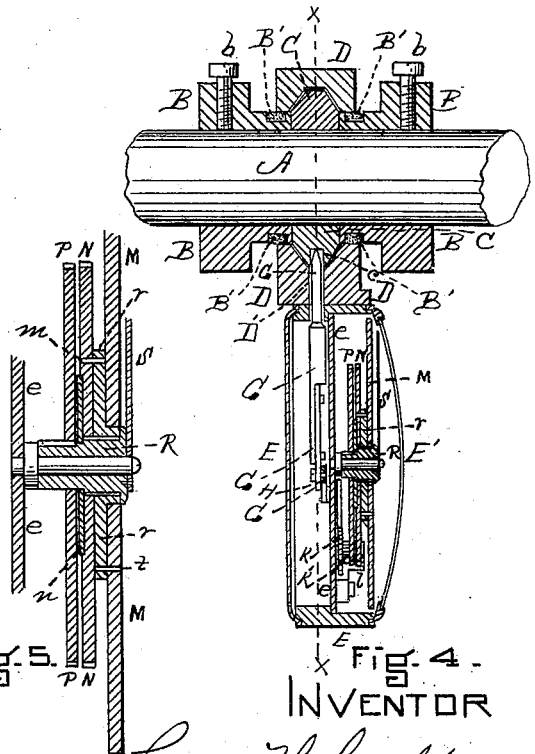

In the accompanying drawings, in which similar letters of reference indicate like parts, Figure 1 is a front elevation of a cyclometer embodying my invention attached to the hub of a bicycle or tricycle. Fig. 2 is a front elevation with the dial and clamp removed. Fig. 3 is a section on line $x\ x$, Fig. 4. Fig. 4 is a transverse vertical central section. Fig. 5 is a similar enlarged sectional view.

A is the hub of the wheel, to which the cyclometer is applied.

B is a clamp made in two parts, secured together by the screws $b$, and made rigid with the hub or axle, so as to rotate with it, by the set-screw $a$.

Fixed to or integral with the clamp B is a cam, C, $c$ being the groove therein, its extent being shown in Fig. 3.

Hung upon the clamp B, and not rotating with it, is the support D, to which is secured the depending case E. By means of the annular grooves B', filled with packing, dust and dirt are prevented from working in at the bearings of the support D, which is made in two parts secured together by the screws $d$, and is further provided with a vertical passage, D'.

E' is the crystal of the case, and $e$ a fixed partition dividing it into two parts.

G is a rod swiveled at its lower end to the free end of the lever H, and extending through the passage D' and a corresponding opening in the case E to the cam-wheel C, being held up to the latter by the spring I, secured at one end to a projection, I', from the partition $e$. The lever H is rigidly secured to the shaft J, which passes through the partition $e$, and carries the pawl L, fixed to it on the front side of said partition. It will readily be seen that, as the cam C rotates with the clamp B and axle A, reciprocating vertical motion is produced in the rod G, which, vibrating the lever H, causes reciprocating rotary motion in the shaft J, to which the pawl L is rigidly secured. The two teeth L' of this pawl engage alternately the star-wheel K, provided with twenty-two teeth, in the well-known manner, producing intermittent rotary motion therein, and in the pinion K', having six teeth, fixed to said star-wheel, which is supported in the bracket $l$. This pinion engages the two gear-wheels N and P on the arbor or shaft R, separated from each other by the disk $n$. The wheel N has one hundred and two teeth, is loose on the arbor R, and is secured by the pin $m$ to the disk $r$, which is secured by the pin $t$ to the dial M, so that the dial rotates with the wheel N. The wheel P is fixed on the arbor R, as is also the index-hand S, so that the wheel P and hand S rotate together. This wheel has one hundred teeth; hence, if the cyclometer be applied to a wheel fifty-four inches in diameter, and the dial be divided into fifty parts, the travel of the wheel over one mile will cause the hand S, carried by the wheel P, to gain one mark on the scale over the dial carried by the wheel N. If a wheel of a different diameter be used, a dial suitably scaled may be applied to the same mechanism, so that but one mechanism is needed for different wheels, provided suitable dials are provided. For example, if the dial be divided into fifty-four parts, as shown, it may be used in connection with a wheel fifty-eight inches in diameter, in which case there would be a slight loss, amounting in running fifty-four miles to twelve fifty-fourths of a mile.

It will be seen that a wheel fifty inches in diameter causes the cam to rotate three hundred and seventy-four times while the dial-wheel rotates once.

The advantage of being obliged to make but one style of mechanism for use on different sizes of wheels is obvious.

Having thus fully described my invention, what I claim, and desire to secure by Letters Patent, is—

1. In a cyclometer, the combination of the following parts, viz: the clamp B, rigidly secured to the axle, and provided with the cam C $c$, the pendent holder D, provided with the passage D', the rod G, the case E, and suitable mechanism, substantially as shown, by which the said rod is adapted to communicate motion to a differential gear, all substantially as and for the purpose set forth.

2. In a cyclometer, the combination of the clamp B, provided with the cam C c, the pendent holder D, provided with the passage D', and the case E, provided with the rod G, lever H, and spring I, said lever arranged to actuate a differential gear, substantially as and for the purpose described.

GEORGE H. GOULD.

Witnesses:
HENRY W. WILLIAMS,
JOSEPH ISHBAUGH.